July 7, 1970

J. WOLFF ET AL 3,518,776

BLOWER, PARTICULARLY FOR HAIR-DRYING LAUNDRY-DRYING OR THE LIKE

Filed June 3, 1968

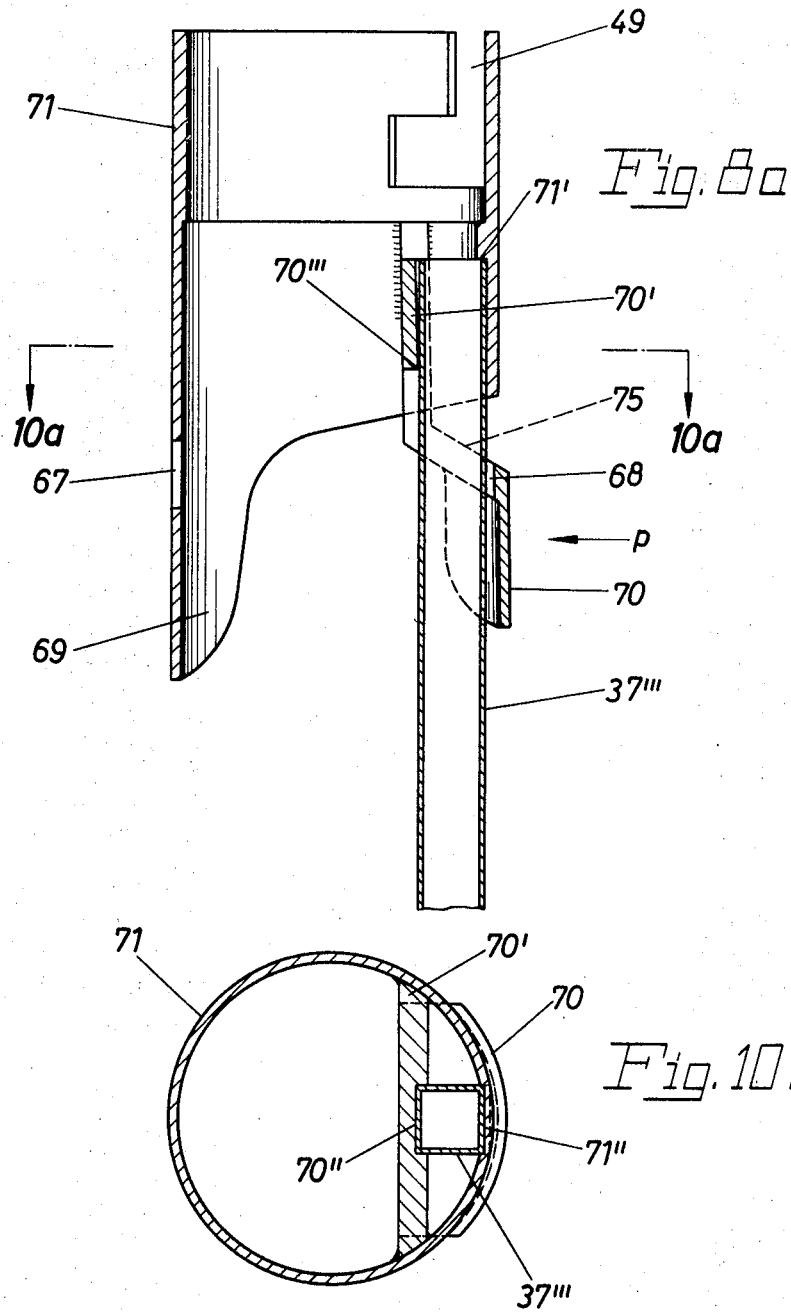

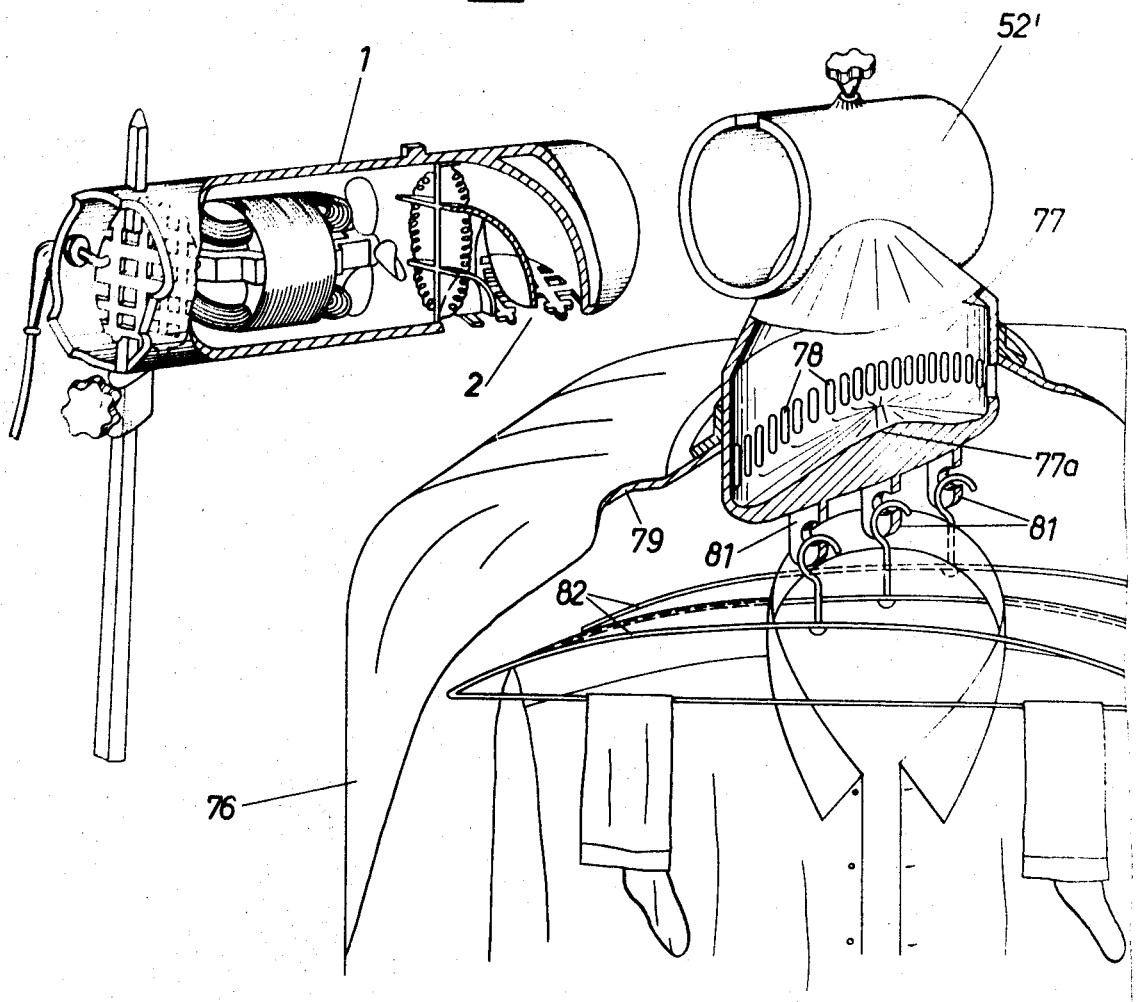

United States Patent Office 3,518,776
Patented July 7, 1970

3,518,776
BLOWER, PARTICULARLY FOR HAIR-DRYING, LAUNDRY-DRYING OR THE LIKE
Joachim Wolff, Hilden, Fritz Krüger, Dussel Post Dornap, Jürgen Göpfert, Solingen auf de Hohe, and Heinz Seitel, Solingen-Ohligs, Germany, assignors to Bremshey & Co., Solingen-Ohligs, Germany, a corporation of Germany
Filed June 3, 1968, Ser. No. 733,918
Claims priority, application Germany, June 3, 1967, 1,585,589; May 22, 1968, 1,703,452; July 14, 1967, 1,557,256, B 93,484; Apr. 25, 1968, 1,757,323
Int. Cl. A45d 20/04
U.S. Cl. 34—97        20 Claims

ABSTRACT OF THE DISCLOSURE

A blower, particularly for hair drying, laundry drying or the like, which comprises a tubular housing serving simultaneously as an arm and having a foot formation supporting the housing. Electrical auxiliary means are disposed in the housing and the latter has at its forward end a radially directed blowout opening and at its rear end an axially directed air suction opening. The electrical auxiliary means include a blower motor and the foot formation has a carrier bushing. The latter leaves free air entrance openings provided therein in an extension of the axial direction of the housing.

---

The present invention relates to a blower, in particular for drying of hair, for drying of laundry or the like, with a tubular housing serving simultaneously as an arm, which housing stands on a foot and contains electric parts as, by example, a heating coil carrier.

For such blowers, the problem arises, on the one hand, to dispose the total parts in a favorable manner as to their mounting in a space-saving manner and safe for use immovably in the housing. On the other hand, it is necessary, to find favorable solutions for the holding of the housing on its foot, furthermore, for the attachment of any additional devices, in order to bring about an adjustment of the blower to the different application purposes.

It is one object of the present invention to provide a blower, which is designed such, that by using a space-saving structure, a solution favorable for its use is obtained.

It is another object of the present invention to provide a blower, wherein the tubular housing containing the blower motor has at its forward end a radially directed blow-out opening and at its rear end an axially directed air suction opening and is insertable at its rear end into a carrier bushing of the foot, which carrier bushing permits free access to air entrance opening disposed in an extension of the axial direction of the housing.

It is favorable thereby, in accordance with the present invention, if the tubular housing has a releasably secured air blow-out branch with a freely suspended drying hood umbrella flush with the radially directed blow-out opening.

An advantageous embodiment resides furthermore, in accordance with the present invention, in the fact, that the foot is pivotally connected with the carrying bushing such that air entrance openings remain on both sides of the pivot joint bars disposed at the carrying bushing and projected through by a pivot pin.

Furthermore, it is favorable, in accordance with the present invention, if the socket connection between the housing and carrying bushing is assured by means of a bayonet slot, which is provided on the carrier bushing and cooperates with a connecting cable emerging radially from the housing.

A further advantageous solution is provided, in accordance with the present invention, such, that the dry hood umbrella sits on a carrying ring slidable from its forward end onto the housing, which carrier ring carries the air passage branch of the umbrella.

A structure advantageous in this direction resides, in accordance with the present invention, in the fact, that the air blow-out branch of the drying hood umbrella is secured by means of a slip connection with sealing gripping of the marginal edges of the radial blow-out opening of the housing on the latter.

A construction particularly advantageous in this direction resides, in accordance with the present invention, in the fact, that the air blow-out branch has an undercut hook-up nose and diametrically opposite a clip wing reaching over the forward end face of the housing.

Another likewise possible arrangement in accordance with the present invention is given such, that the air blow-out branch of the drying hood umbrella is retained on the housing by magnetic means such, that the undercut hook-up nose engages the housing and a spreading cone sitting on and insertable into said housing is coordinated to the opposite holding magnet, the oblique face of the spreading cone engages the edge of the branch.

A favorable holding of all electrical parts, as in particular the blow motor and the heating coil carrier in the housing is brought about without outwardly projecting screws, in accordance with the present invention, such, that the parts disposed therein are merely in socket connection in the outer housing, such, that the blow motor housing, carrying off center the curved switch carrier plate, enters the inside of the star-shaped heating coil carrier and clamps the same by widening to the inner wall of the outer housing pressing against the same.

Favorably, in accordance with the present invention, the switching slide is disposed in an outer groove of the housing and has at its outside a plurality of holding wings moving over the inner edges of two housing slots and has furthermore a joint projecting through a slot of the housing, which enters into an opening of the switch slide member.

By this arrangement, it is furthermore of advantage, if the switch carrying plate is adjusted to the inner curve of the housing, extends from the propeller side end of the blow motor above the propeller and has at its free end a stop, which steps against an inwardly directed shoulder on the inner wall of the housing.

In order to assure a good axial flow through the housing, in accordance with the present invention, an endside perforated closing plate of the outer housing is provided, which is anchored by means of tensionable claws in the outer housing and has projections inside of the housing, which engage the stop of the switch carrying plate.

The good holding of the heating coil carrier is enhanced in connection with the simple structure, in accordance with the present invention, such, that the star-shaped heating coil carrier has about U-shaped profiles connected with the leg portions and preferably folded of one piece.

A favorable holding adjustable as to its height, which permits also the arrangement of the tubular housing in axial extension of the foot formation or in a cross position to the foot, is provided, in accordance with the present invention, in combination with the good flow possibility such, that the carrying bushing has two wings with clamping openings projecting in axial direction for the penetration of the foot formation from which one wing is steplike set off and has within the range of the step the passage opening and projects beyond the end marginal edge of the carrying bushing. Preferably, this wing is elastically resilient.

For the drying of laundry and clothes, respectively, in accordance with the present invention, the air blow-out branch carries a laundry and clothing jacket, respectively, and continues towards the inside thereof into means for suspending laundry pieces and clothing pieces, respectively. Preferably, the bottom of the jacket is thereby formed self-carrying.

Furthermore, it is thereby favorable if, in accordance with the present invention, the means for suspension of the laundry and clothing pieces sit at the underside of a stream cone of the air blow-out branch. The suspension means can comprise thereby, in accordance with the present invention, in a favorable manner a carrier which is attachable by means of snappers, clips or hooks and/or magnetic holding means.

Due to all these features, a blowing machine is created which is favorable as to its manufacture, spacially small, easily collapsible and particularly advantageously usable, which blowing machine can be adjusted with a simple handling to different applications. For the mounting of the parts disposed in the housing, no screw or rivet connections are required which project through the outer cover of the housing and which would create danger sources if the housing is gripped with wet fingers. The mounting can take place in simplest manner from one end of the housing which is particularly of advantage, if the housing is designed such, that the air exit takes place in radial direction to the housing cylinder, so that the other end is closed up to a great extent by an inner guide wall of the housing. The parts secure themselves relative to each other. The blower motor housing assures the position of the heat coil star by corresponding widening of the clamping holding. The chosen star shape for the heating coil carrier with the formation of about U-shaped profiles, the leg members of which are connected together preferably by use of a single fold strip for the entire heating coil carrier, favors the desired widening up to the clamping seat, particularly, when the heating coil carrier comprises corresponding favorable material, as silicon-glass fabric. The entrance of the blower motor into the inside of the heating coil star brings, on the other hand, also again a centered position of the blow motor. The blow motor, in turn, carries the switching carrier plate and, in particular, in an integral arrangement with the latter. The one end side of the switch carrier plate limits thereby the insert position of the blow motor into the heating coil star. The other end side of the switch carrier plate abuts with a stop against the shoulder on the inner wall of the outer housing, so that the final insert position is limited by abutment. This insert position, already limited for abutment in one direction, is then assured by the projections of the end side closing plate of the outer housing. The closing plate lies correspondingly far from the end of the outer housing in particular then sufficiently wide, if the outer housing has within the range of one end lateral air entrance slots, at which the suction air enters, in case the housing is set up on this end of the outer housing. Upon penetration of the closing plate, it is merely necessary to provide the claw holding. These are the sole screws, which are necessary at all and have to be tightened. Similarly, the dismantling for the purpose of repair or the like is very simple. The outer switch slide is coordinated after assembly of the inner parts simply by means of the snap connection to the outer housing. By complementary engagement of the joint into the opening of the switch slide member, the coupling enters for the switching movement. The guide of the air stream is most favorable, in the direction of the suction air, as well as in the direction of the blow-out of the air in the drying hood umbrella, furthermore, upon favorable arrangement of the inner parts in the housing concerning the cooling of the blower motor. The drying hood umbrella can be coordinated in simple foolproof manner to the projecting housing. The same applies to the arrangement of the housing to the carrying bushing of the drying hood foot, which preferably is designed such, that it can be clamped to a table and, under circumstances, also be adjusted as to its height. The structure is collapsible to the smallest space, and, in particular, mainly due to the removability of the umbrella from the comparatively small housing and due to the possibility to release the housing from the foot and, finally, due to the possible telescoping of the foot itself. The housing is a releasable structural unit and is thus freely mountable or usable as a manually operating device. The carrier bushing and, thereby, under circumstances, also the tubular housing sitting thereon plus the drying hood umbrella can be adjusted as to their height on the foot. This is possible by a one-arm operation. One requires merely to displace the one elastic wing against its elastic tension in order to release the clamping seat on the foot. The same hand, which carries this release of the clamping seat, has the carrying bushing in the hand, and can provide the height displacement on the foot.

The opening is disposed within the range of one step. The carrier bushing permits due to this opening in the step of the elastic wing and an inner abutment limitation even an axial mounting of the blower on the foot, and in particular also by use of the elasticity of the wing as a clamping force. The design is simple as to its manufacture, under circumstances even due to production in integral form of synthetic material. It is assured, nevertheless, that a maximum air entrance opening-cross-section remains open. The wing reduces the air entrance cross-section neglectably only. The section of the foot extending crosswise through the air entrance opening brings, as has been found, no essential interference of the air entrance. By mounting of the other ring carrying the laundry- and clothing-jacket, respectively, above the air blow-out branch a change to another use can be performed fast.

With these and other objects in view, which will become apparent in the following detailed description, the present invention will be clearly understood in connection with the accompanying drawings, in which:

FIG. 8a is a longitudinal section of the carrier bushing including the foot with axial flush arrangement of both parts;

FIG. 9 is a top plan view of the showing in FIG. 8a;

FIG. 10a is a section along the lines 10a—10a of FIG. 8a;

FIG. 11 is a perspective view of the device with a laundry drying jacket prior to the attachment thereof to the housing;

Figure 1:
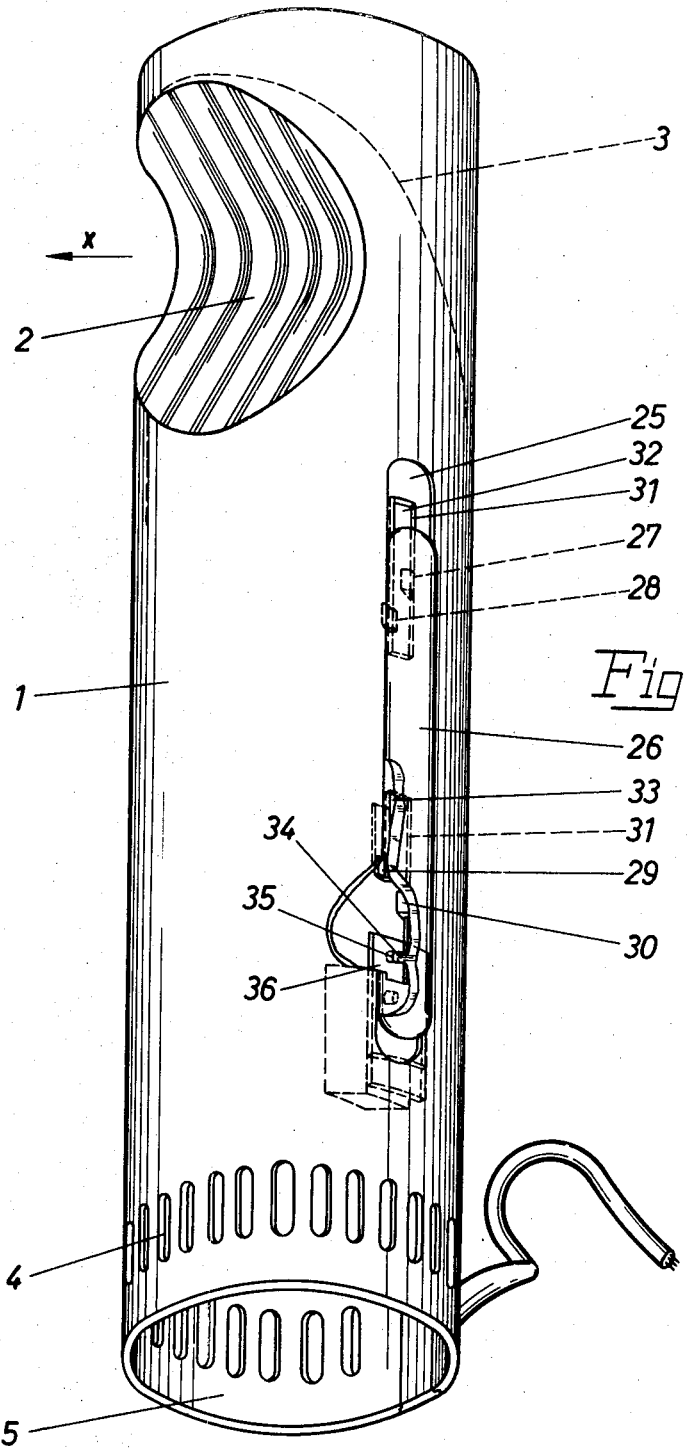
FIG. 1 is a perspective side view of the blower housing partly broken away for better demonstration.

Referring now to the drawings, and in particular to FIG. 1, the blower comprises a cylindrical outer housing 1. The latter has a radially directed air entrance opening 2, to which is coordinated a guide wall 3. The air emerges in the direction of the arrow $x$.

At the opposite end, lateral air entrance openings 4 are provided on the jacket which openings are effective substantially, when the end side opening 5 is closed up, due to the fact that the outer housing is positioned upright on a plate or the like.

Figure 2:
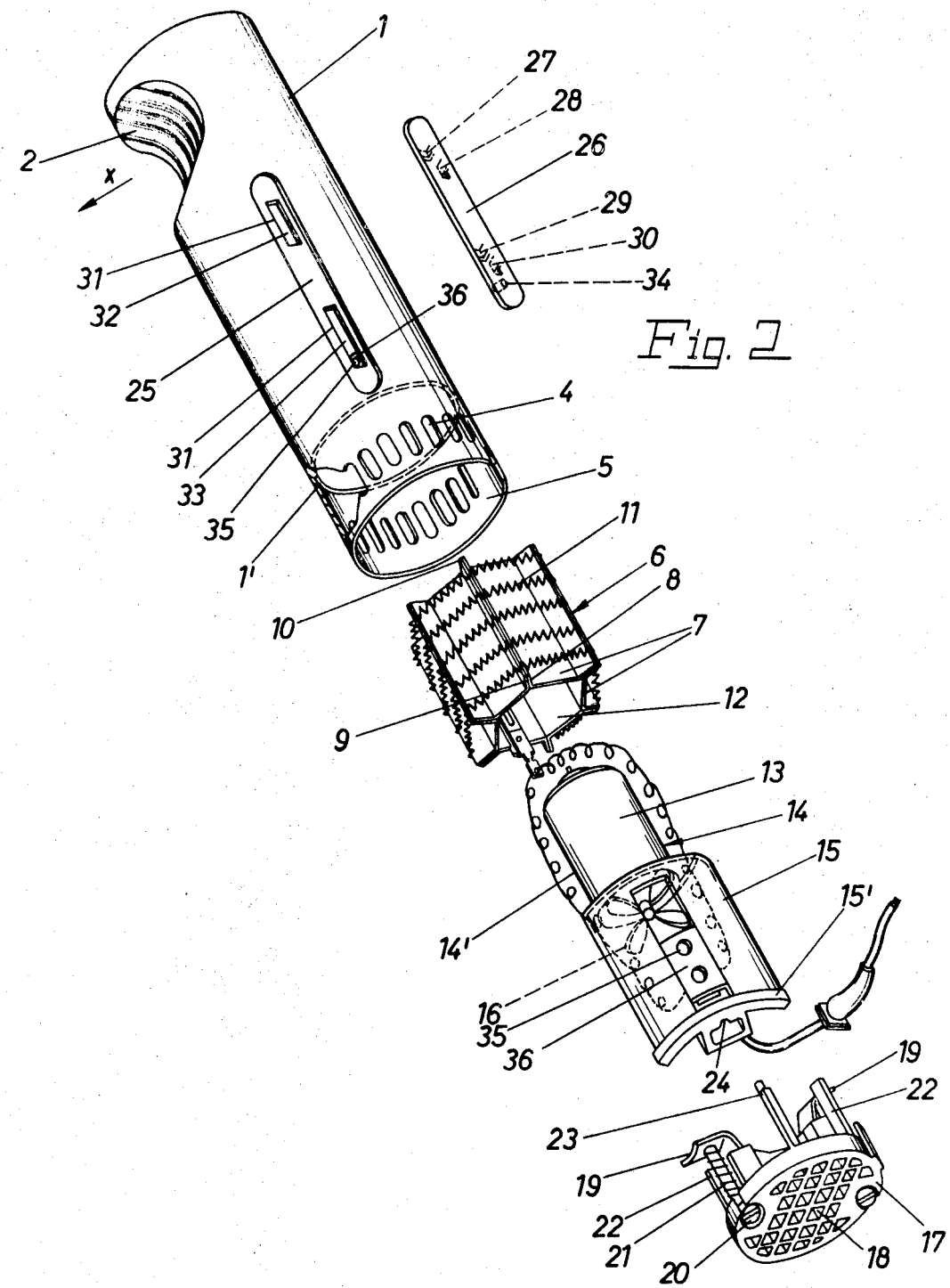
FIG. 2 is a perspective exploded view of the blower, the inner parts being shown outside of the housing for purpose of better demonstration.

Referring now to FIG. 2 of the drawing, a star-shaped heating coil carrier 6 is arranged in the outer housing 1. The heating coil carrier 6 comprises preferably a strip, a paragon- or ring-jacket folded and has U-shaped profiles 7 with leg members 8 and 9, which are in suitable manner connected together for instance, by gluing, welding or riveting. These outwardly directed leg members form edges 10 projecting into the air stream channel over which the heat coil 11 extends.

The cylindrical section 13 of the blow motor 14 projects into the inside 12 of the heat coil star 6. This entrance takes place with corresponding radial expansion clamping such, that the heat coil star is thereby pressed and clamped against the inner wall of the outer housing 1.

A switch carrying plate 15 is rigidly secured to the blower motor housing 14'. The switch carrier plate 15 is curved. The curvature corresponds to a great extent to the outer housing 1. The switch carrier plate 15 originates from the propeller side end of the blower motor 14 and extends above the propeller 16. It projects beyond the propeller. The front end has a stop 15'. The latter enters into the insert position against the inwardly directed shoulder 1' at the inner wall of the outer housing 1. This abutment limits the end insert position.

The inside opening end 5 of the outer housing 1 is closed up with the inside lying closing plate 17. The latter has air entrance holes 18. It is otherwise equipped with claws 19 which are directed inside into the housing 1. Clamping screws 20 are coordinated to the tensioning screws 20 which project through springs 21. By tightening the screws 20, the crawls 19 can be moved radially outwardly. They press then against the inner wall of the outer housing 1, whereby a tensioned holding of the closing plate 17 is brought about.

The closing plate 17 has projections 22 directed inwardly into the housing 1. These projections 22 abut the stop 15' or the switch carrying plate 15. The switch carrying plate 15 supported, on the one hand, by a shoulder 1' of the outer housing 1, and, on the other hand, by the projections 22, is completely secured in axial direction and beyond that also the integrally connected blow motor 14. The closing plate 17 has in addition a centering pin 23, which enters the inside opening 24 of the switching carrying plate 15.

The outer housing 1 has a groove 25 extending in longitudinal direction. A switch slide 26 runs in the groove 25. The switch slide 26 has at its bottom side holding wings 27, 28, 29 and 30. The latter extend snap-like over the inner edges 31 of the slots 32 and 33. By this snap-like gripping, the switching slide 26 is retained. It has at its underside also a joint 34. The latter enters during snapping operation into an opening 35 of the switch slide member 36, which is disposed in the switch carrying plate 15.

Figure 4:
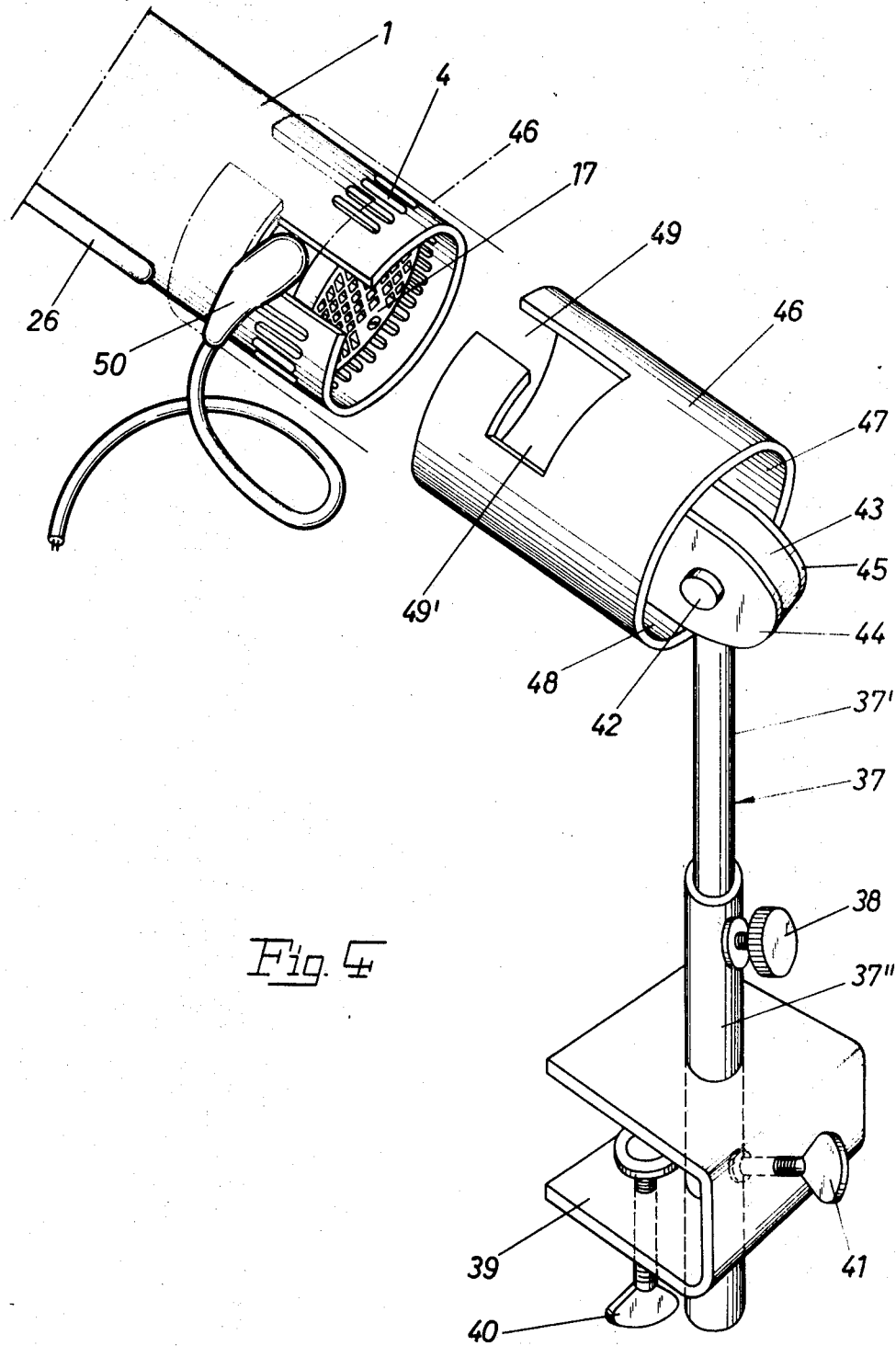
FIG. 4 is a perspective view within the range of the socket connection between the housing and the drying hood foot.

The housing can be carried from the telescopically movable drying hood foot 37 (FIG. 4), which is formed by the telescoping members 37' and 37'', which can be arrested relative to each other by means of a set screw 38 (FIG. 4). At the lower end of the screw-shoe 39, to which a tensioning screw 40 is coordinated and which, upon releasing of a pressure screw 41, permits a withdrawal of the foot 37 from the shoe 39.

Figure 3:
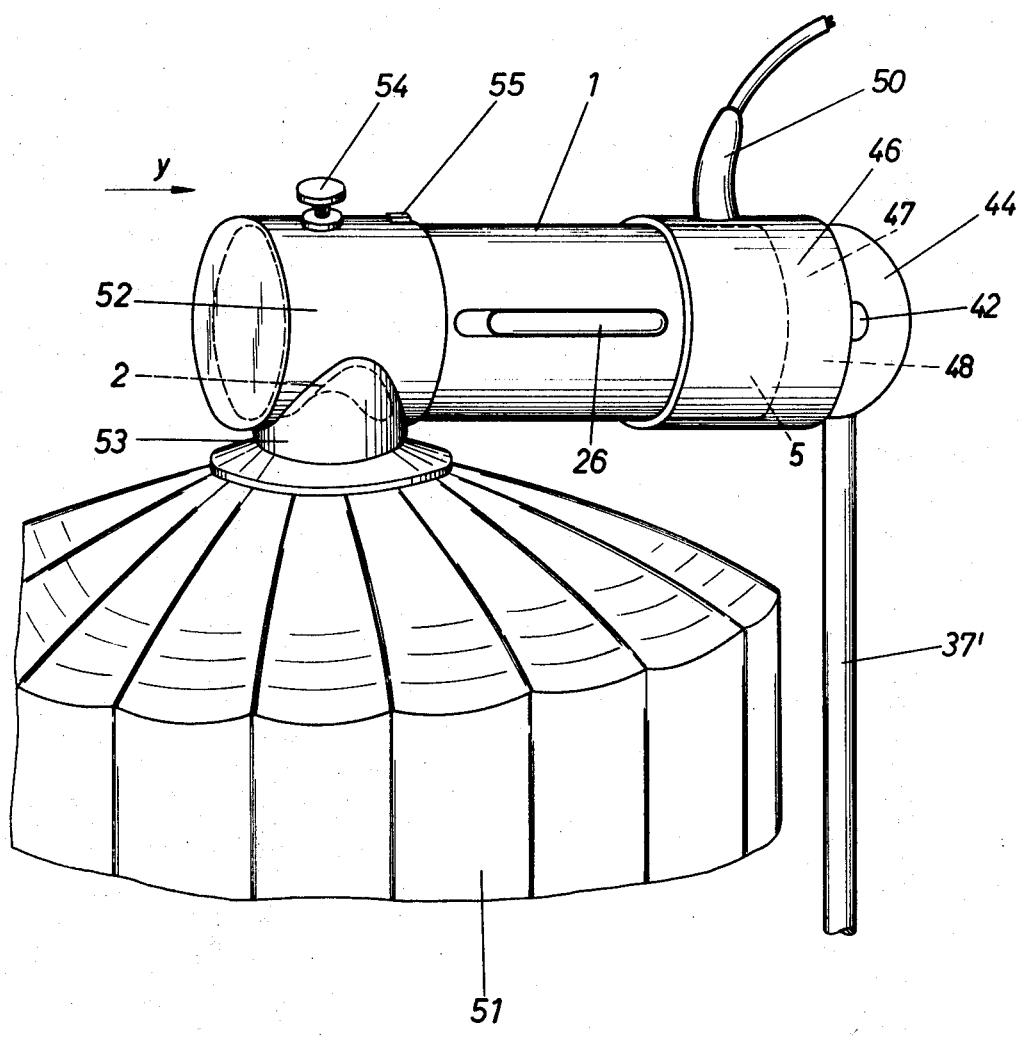
FIG. 3 is a perspective view of the drying hood.

At the upper end, the drying hood foot 37 has in the embodiment shown in FIG. 3 a pivot pin 42. The latter projects through the pivotal lugs 44 and 45 spaced apart from each other by means of an intermediate member 43. These pivot lugs 44 and 45 sit on the carrier bushing 46. On both sides of the pivot lugs 44 and 45 engaging the inside of the carrier bushing 46 remain air entrance openings 47 and 48.

The housing 1 is securable on the carrier bushing 46 by means of a socket connection. The housing 1 forms simultaneously a cantilever arm of the dry hood. The socket connection between the housing 1 and the carrier bushing 46 is secured by means of a bayonet slot 49 of the carrier bushing 46. In the escape recess 49' of the bayonet slot 49 enters thereby the end of a connecting cable emerging radially from the housing 1 and being there armed by means of a cable jacket 50. The latter is bent in the direction, so that the cable hangs down on the using side such, that the rotary load of the housing occurring therein operates against the release from the bayonet slot holding.

The drying hood umbrella 51 (FIG. 3) can be mounted on the forward end of the housing 1 in a different manner.

FIG. 3 shows a first possibility for a suitable coordination of the drying hood umbrella. In this arrangement, the drying hood umbrella 51 has a carrier ring 52, which carries the air blow-out branch 53 in coaxial position to the radially directed blow-out opening 2 of the housing 1. The carrying ring 52 is slidable from the forward end in the direction of the arrow $y$ onto the housing 1. A screw 54 secures the slide-on position. An abutment 55 limits the sliding-on and adjusts simultaneously the correct radial coordination of the ring 62 relative to the housing 1.

Figure 5:
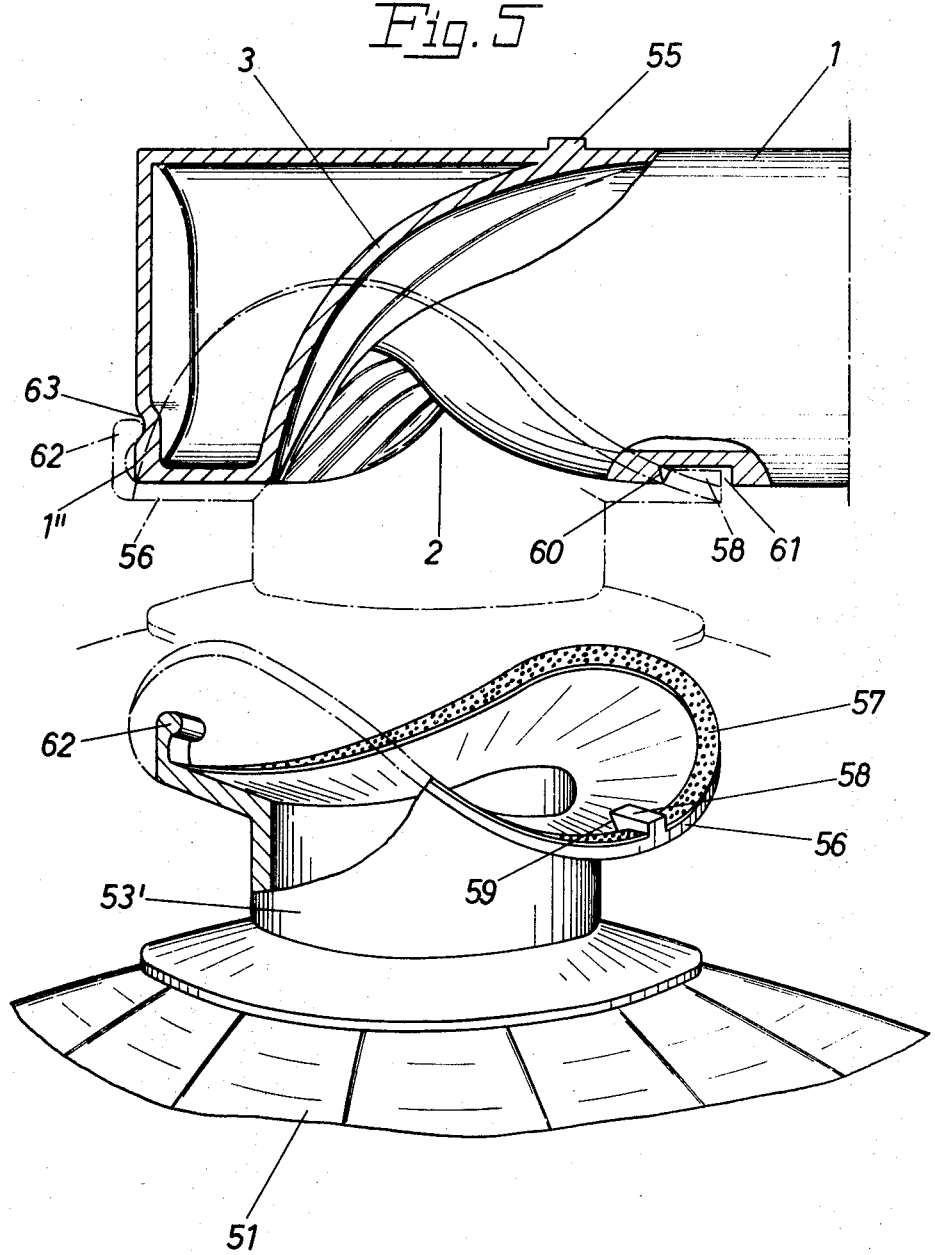
FIG. 5 is a side elevation of the front end of the housing partly broken open with a perspective view of the drying hood umbrella.

Referring now again to the drawings, and in particular to FIG. 5, the drying hood umbrella 51 is secured to the housing 1 by means of a slip connection. The branch 53' of the drying hood umbrella 51 has thereby a flange 56 the upper end face of which is adjusted to the peripheral form of the housing 1. The flange 56 has a sealing means 57. By this arrangement, a tight engagement of the flange 56 on the peripheral face of the housing 1 in the range of the blow-out opening 2 is brought about.

The flange 56 has a hook-in nose 58, which has an undercut shoulder 59. The latter grips by means of a counter shoulder 60 in a recess 61 of the housing 1. The flange 56 has simultaneously a clips wing 62 and in particular diametrically opposite to the hook-in nose 58. This clips wing 62 engages the forward end face of the housing 1 by means of the marginal edge 1'' and anchors itself in a hollow 63 at the end side of the housing 1. The securing of the umbrella takes place in this embodiment such, that the first the hook-in nose 58 is brought into engagement and, thereafter, the clips wing 62 is snapped over the edge 1'' up to the hollow 63.

Figure 6:
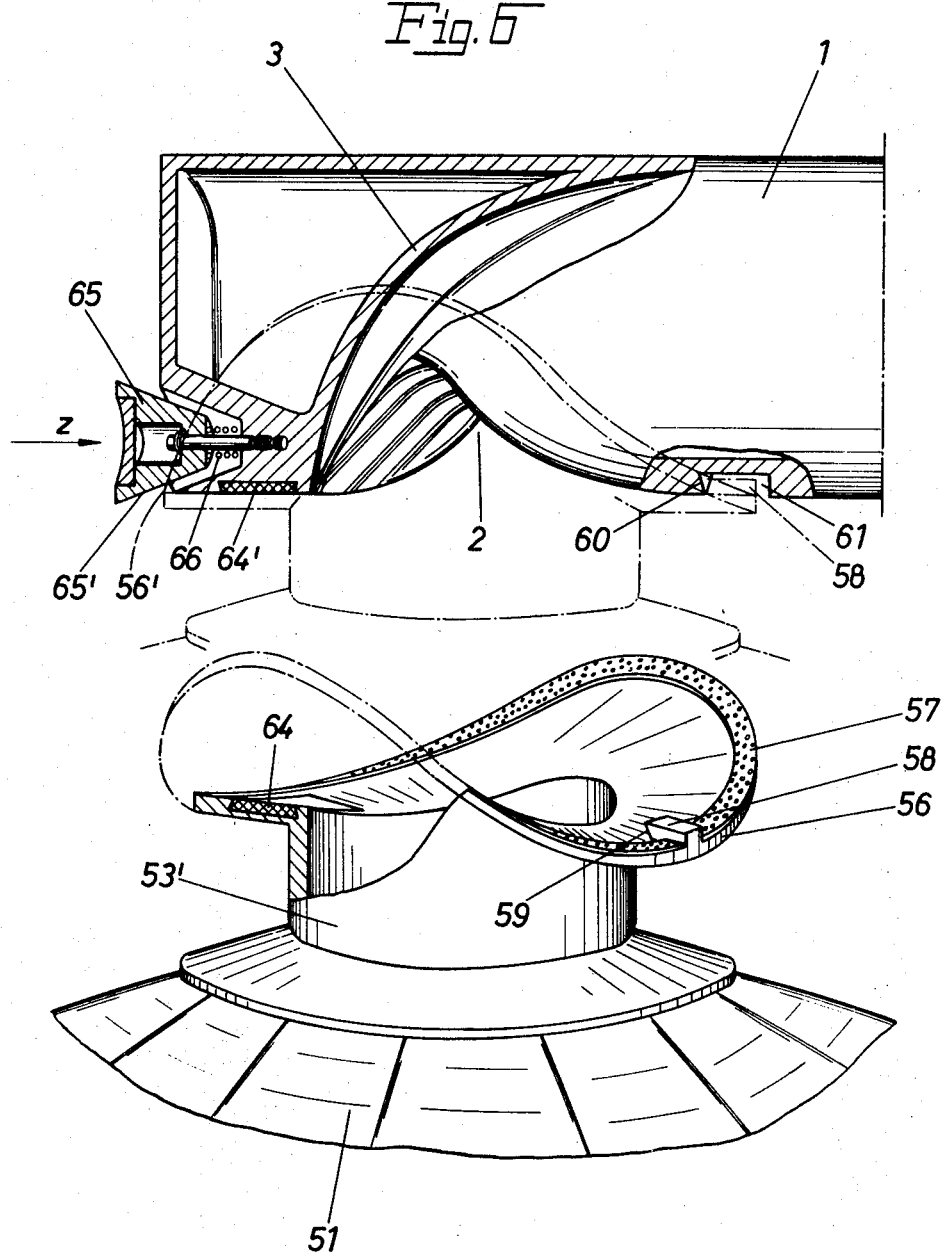
FIG. 6 is a side elevation of another embodiment of the front housing end, partly broken up with a fractional showing of the corresponding drying hood umbrella.

Referring now again to the drawings, and in particular to FIG. 6, the branch 53' has a flange 56, which is designed in the same manner and also carries in the same manner a sealing member 57, however, with the difference, that in the diametrically opposite position to the hook-in nose 58, a magnet 64 is provided. A counter magnet 64' and an insert member made of magnetizing material, respectively, sits on the housing 1. In reversing the structure, the flange 56 can have also the insert member consisting of magnetizing material. The securing of the dry hood umbrella 51 takes place in this embodiment such, that at first the hook-in nose 58 is brought into engagement with the shoulder 60 and then the opposite end is pressed into tight engagement. The magnetic holding force is then effective. For releasing this holding a spreading cone 65 is provided. The latter sits on the housing 1. It is displaceable in the direction of the arrow $z$ and loaded against the arrow $z$ by the spring 66. Its outer oblique face 65' is effective upon pressing in on the marginal edge 56' of the flange 56, so that this flange is spread out in this range from the housing 1. A small spreading effect will suffice, in order to overcome the magnet holding. The flange 56 and, thereby, the drying hood umbrella 51 is thereby completely removable.

Figure 7:
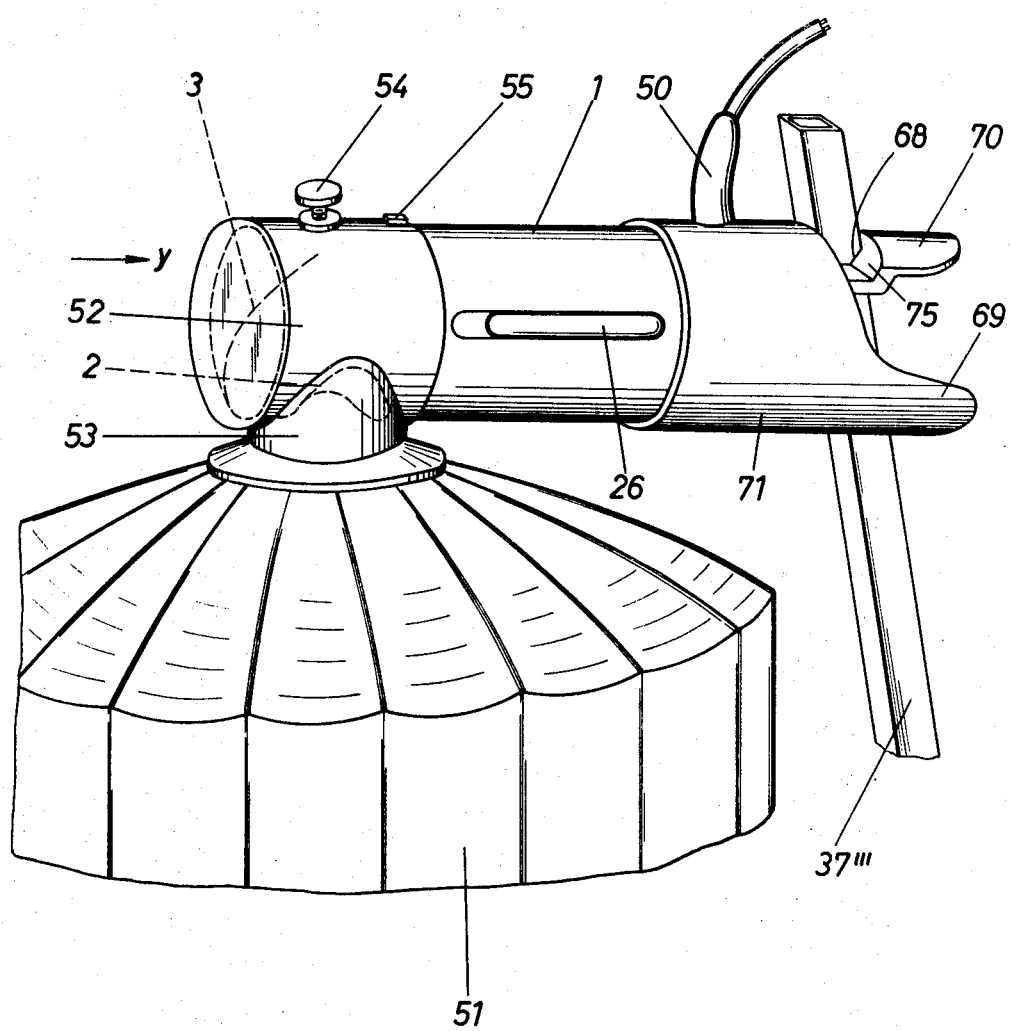
FIG. 7 is a perspective view of the drying hood with a different holding means on the foot.
Figure 8:
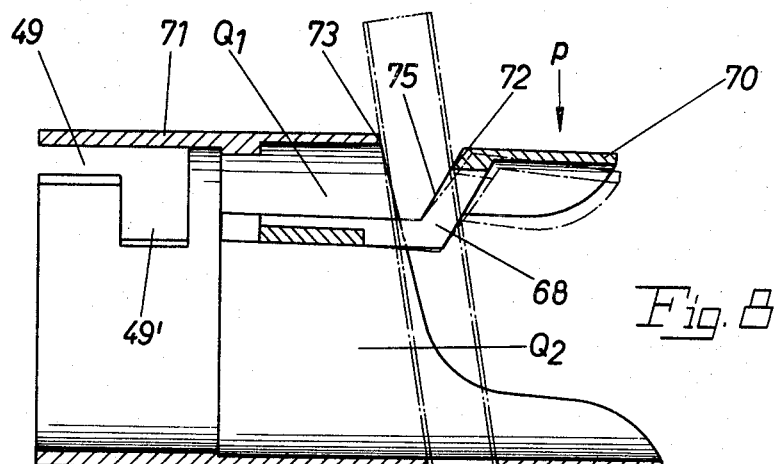
FIG. 8 is a longitudinal section through the carrying bushing including the foot, as set forth in FIG. 7.

Referring now to the embodiment disclosed in FIG. 7, the preferably longitudinally variable drying hood foot 37''' projects clamping openings 67 and 68 from the wings 69 and 70, which are formed by the rear end of the carrier bushing 71. At least the wing 70 is formed by itself elastically resilient, so that it can be displaced into the position shown in point-dotted lines in FIG. 8 by means of exerting pressure in the direction of the arrow $p$. The openings 67 and 68 are formed as clamping-holding openings. The elastic resiliency of the wing 70 causes an edging clamping. The opening clamping edge 72 of the opening 68 presses, thereby, the foot 37''' against the end marginal edge 73 of the carrier bushing 71. This pressure causes simultaneously a pressure on the edge 74 of the clamping opening 67. The wing 69 is arranged in favorable manner in opposite position to the wing 70, so that with the fingers of a single operating hand a movement of the wing 70 in the direction of the arrow $p$ is made possible.

Figure 9:
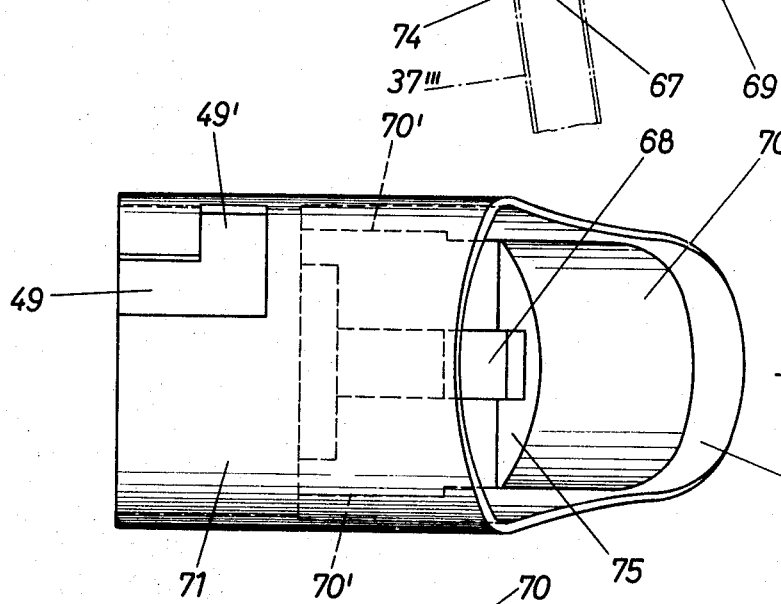

The wing 70 forms a step 75. The opening 68 extends within the range of this step. The connection between the wing 70 and the carrier bushing 71 is such, that the side sections 70' (FIG. 9) start from the inner wall of the carrying bushing 71. Thus remains, thereby, above the wing 70 of the air passage cross-section Q1 (FIG. 8) and therebelow the air passage cross-section Q2.

Figure 10:
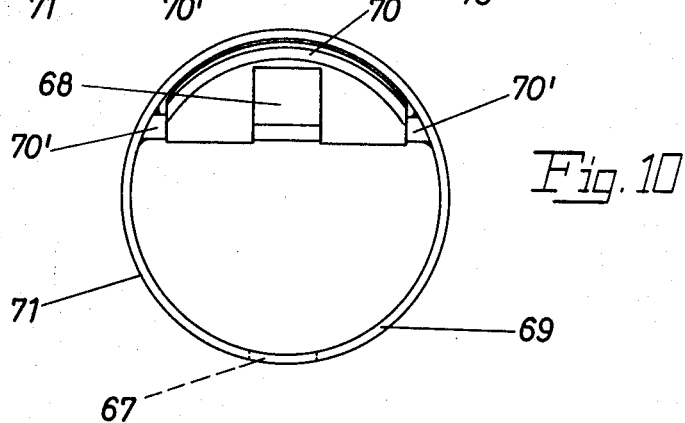
FIG. 10 is an end view towards the rear end of the carrier bushing.

The embodiment in accordance with FIGS. 8a and 10a provides in addition to the possibility of a coordination of the housing 1 crosswise to the foot 37''' also that of an axial mounting on the free end of the foot. This additional use form is realized by a provision of the passage opening 68 within the range of the step 75 of the wing 70.

The insert length is limited by the cam-shaped abutment 71' formed on the housing side. The oppositely disposed support of the socket guide is formed by the securing stay 70' of the wing 70. This stay 70' has within the range of the socket zone a groove 72'. The oppositely disposed wall section of the bushing 71 has a corresponding groove 71''. The foot 37''' having a square cross-section enters here by engagement of forces.

The formation of the wing of elastic material permits the realization of a clamping seat for the carrier bushing 71 on the end of the foot 37'''. For the entrance of this foot, a pressure is exerted in the direction of the arrow $p$ onto the wing 70, which is thus secured against the inner elasticity of the latter. This pressing is easily possible by a one-hand operation and in particular for the reason, because the counter wing 69 formed by the carrier bushing 7 and projecting from the end side is disposed opposite the wing 70, so that a good gripping with one hand is made possible. If now, the wing 70 is released, it edges the inserted end of the foot 37''' due to its inherent return force. The clamping position is obtained such, that the stay edge 70''' steps actively against the foot 37''' and presses the latter into the wall groove 71'. This clamping holding suffices, in order, for instance, to remove the housing 1 from the carrier bushing 71 to overcome the engagement friction of the socket connection, so that during such removal the carrier bushing 6 remains on the stative. The further passage opening 67 makes possible the above already emphasized other form of use, which likewise is realized as a clamping displacement and renders possible a continuous height displacement of the carrying bushing 71 with the blower 1.

In accordance with the present invention, as a further additional device can be used a laundry drying jacket 76 (FIG. 11). The laundry drying jacket, which can be adjusted jointly with the hair dryer by means of a clamp displaceable and securable on the stative endlessly to any desired height, is applicable by means of a carrying ring 52' mountable at the end of the blower.

Figure 12:
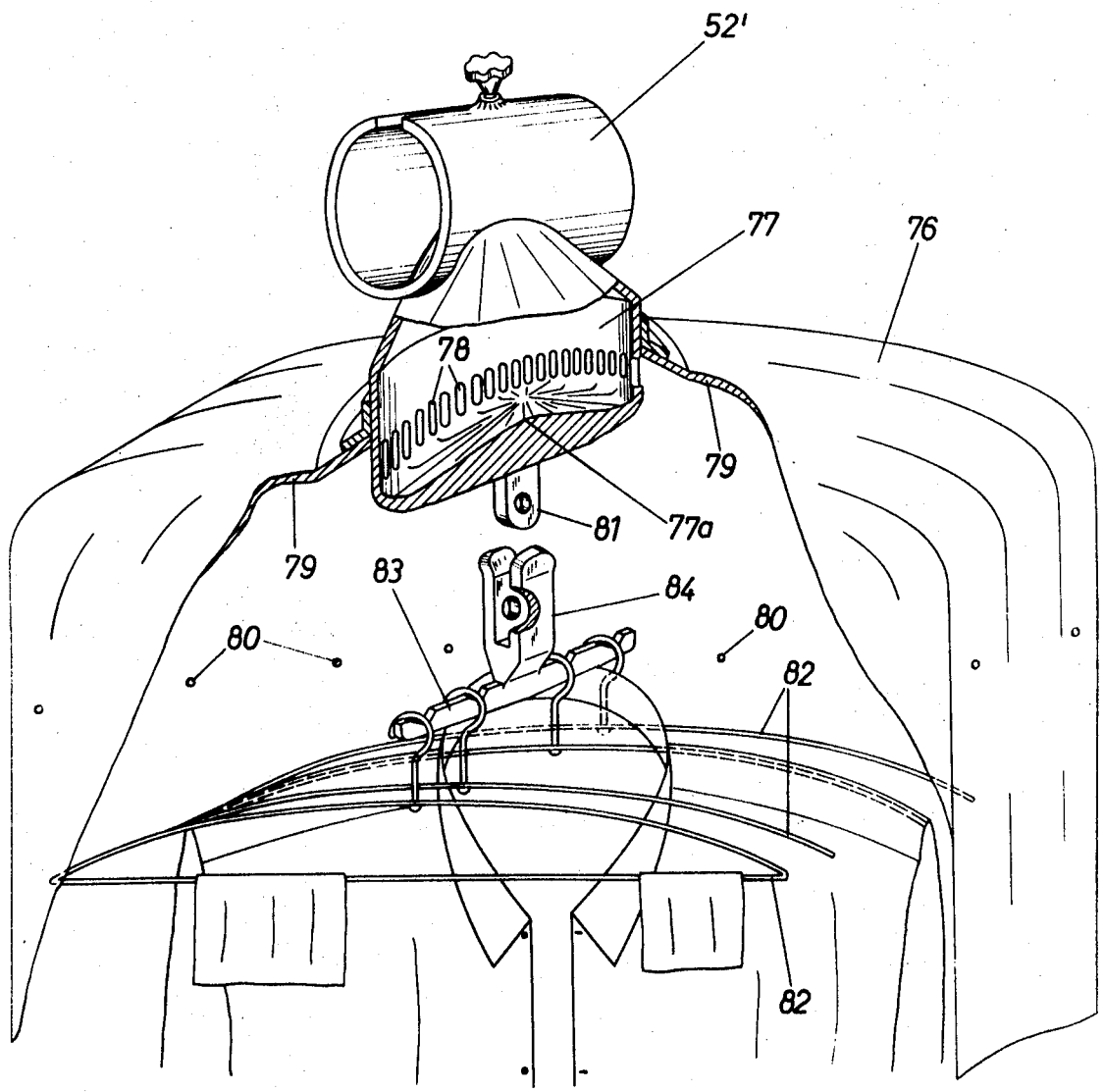
FIG. 12 is another embodiment of the laundry drying jacket disclosed in FIG. 11.
Figure 13:
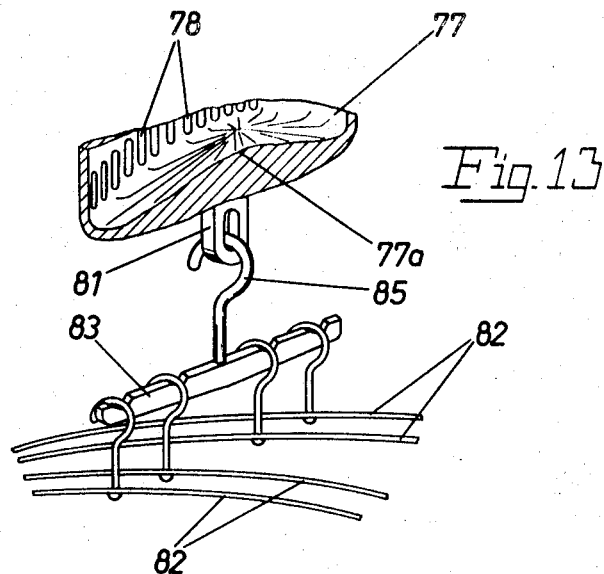
FIG. 13 is a fragmentary perspective view of the suspension member consisting of a carrier for a plurality of laundry drying hangers.
Figure 14:
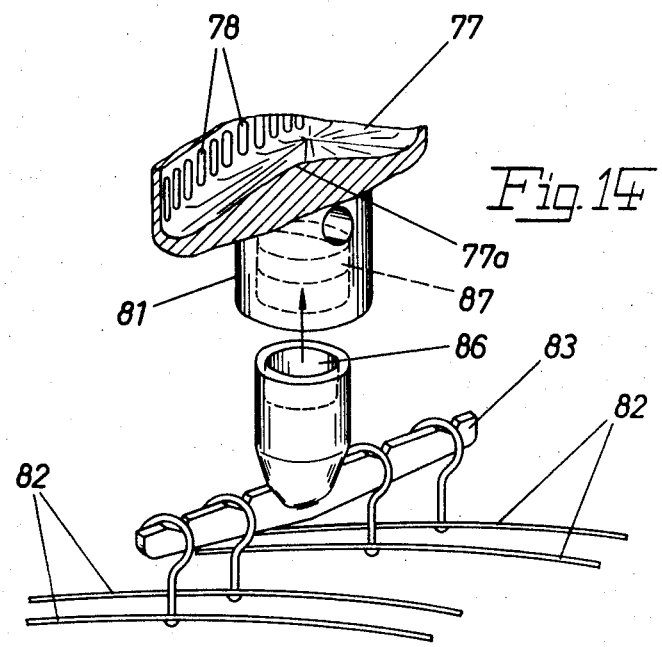
FIG. 14 is a fragmentary perspective view of a laundry suspension member suspendable by means of magnetic means.

The mounted carrying ring 52' carries the air blow-out branch 77, which coincides in mounted position with the air exit opening 2 of the housing. The branch 77 carries in turn the jacket 76. The branch 77 is equipped with a cone 77a, which distributes radially equally the air stream reaching the tubular branch 77 through the openings 78 and into the jacket 76. The latter comprises preferably foldable material and can have a self-carrying reinforcement 79, and air escape openings 80. For the suspension of the laundry pieces, suspension eyes 81 provided on the air blow-out branch 77 serves the suspension, into which the laundry drying hangers 82 can be directly suspended. In case that only one holding eye 81 is provided and still a plurality of hangers 82 should be provided in the jacket 76, in accordance with the embodiments disclosed in FIGS. 12, 13 and 14, one carrier 83 can be used for a plurality of clothing hangers, which by means of a snapper or clips 84, a hook 85, a magnet holding device 86 and 87, or the like, are to be suspended in the jacket 86. The magnet holding means 87 can, as can be ascertained from FIG. 14, be embedded in the suspension eye 81. Upon non-use of the magnet holding means, this eye can serve also for suspension of laundry drying hangers 82 and a hanger carrier 83 equipped with a hook, respectively.

We claim:

1. A blower, particularly for hair drying, laundry drying or the like, comprising a tubular housing of exact cylindrical configuration having flush ends and serving simultaneously as an arm and having a foot formation supporting said housing operative in angular position of said housing and adapted to be used with or without said foot formation, electrical auxiliary means disposed entirely in said housing, said housing having at its forward end a radially disposed blow-out opening formed to receive means for further feeding internally of one of said flush ends of emerging air and at the other end of said flush ends an axially directed air suction opening, said electrical auxiliary means including a blower motor, said foot formation including a carrier bushing, said carrier bushing including means for releasably connecting with said housing, said carrier bushing leaving free air entrance provided therein for selective axial or radial entrance in an extension of the axial direction of said housing, an air blow-out branch releasably secured to said housing at the forward end of the latter juxtaposed with said radially directed blow-out opening, and said blow-out branch having a freely suspended drying hood umbrella.

2. The blower, as set forth in claim 1, which includes pivot means for connecting said foot formation with said carrier bushing, said pivot means comprising joint bars and a pivot pin extending through said joint bars, and said carrier bushing defining jointly with and on both sides of said joint bars air entrance openings.

3. The blower, as set forth in claim 1, which includes a bayonet joint disposed between said housing and said carrier bushing securing the latter to said housing, said bayonet joint including a bayonet slot disposed on said carrier bushing, and a feeding cable operatively cooperating with said bayonet slot.

4. The blower, as set forth in claim 1, which includes a carrier ring slidingly received on said housing from its forward end, and carrying said blow-out branch of said drying hood umbrella.

5. The blower, as set forth in claim 1, which includes
a clip connection between said air blow-out branch of said drying hood umbrella and said housing, and
said clip connection gripping sealingly the marginal edges of said radial blow-out opening of said housing.

6. The blower, as set forth in claim 5, wherein
said air blow-out branch has an undercut hook-in nose member, and
a clip wing overlapping the forward end face of said housing and disposed diametrically opposite said hook-in nose member.

7. The blower, as set forth in claim 5, which includes
magnetic means for holding said air blow-out branch of said drying hood umbrella on said housing,
said undercut hook-in nose member of said air blow-out branch engages said housing,
said magnetic means include holding magnets disposed diametrically opposite said hook-in nose, and
a spreading cone sitting in said housing is coordinated to said holding magnets, and the inclined face of said cone engaging the edge of said air blow-out branch.

8. The blower, as set forth in claim 1, wherein
said electric auxiliary means are in socket connection with said housing, and which includes
a curved switch carrier plate,
a heating coil carrier of star-like formation,
a blow-motor housing carrying off center said switch carrier plate and entering the inside of said heating coil carrier, and
said blow-motor housing clamping by pressure said heating coil carrier on the inner wall of said housing.

9. The blower, as set forth in claim 1, which includes
a switch slide disposed in an outer groove of said housing,
said switch slide having a plurality of holding wings disposed at the bottom side of said switch slide,
said housing having slots and said holding wings engaging the inner edges of said slots,
a joint extending through one of said slots of said housing, and
a switching slide member having an opening and said joint entering said opening.

10. The blower, as set forth in claim 8, wherein
the curvature of said switch carrier plate is adjusted to the inner curvature of said housing,
said switch carrier plate extends from the propeller side end of said blower motor above said propeller and has a stop at its free end, which stop engages an inwardly directed shoulder on the inner wall of said housing.

11. The blower, as set forth in claim 10, which includes
a perforated closing plate at the end side anchored in said housing by means of tensionable claws and has inwardly directed projections which engage said stop of said switch carrier plate.

12. The blower, as set forth in claim 1, which includes
a star-shaped heating coil carrier having U-shaped profiles including leg members connected with each other and is integrally folded.

13. The blower, as set forth in claim 1, which includes
a carrier bushing having two wings with clamping openings and projecting in axial direction for passage of a foot,
one of said wings is set off step-like, has the passage opening within the range of the step and extends beyond the end marginal edge of said carrier bushing.

14. The blower, as set forth in claim 13, wherein
said one of said wings is formed elastically resilient.

15. The blower, as set forth in claim 13, wherein
said passage opening extends within the range of said step.

16. The blower
a tubular housing serving simultaneously as an arm and having a foot formation supporting said housing,
electrical auxiliary means disposed in said housing,
said housing having at its forward end a radially disposed blow-out opening and at its rear end an axially directed air suction opening,
said electrical auxiliary means including a blower motor,
said foot formation having a carrier bushing, and
said carrier bushing leaving free air entrance openings provided therein in an extension of the axial direction of said housing,
a jacket for laundry and clothing,
a carrier ring for securing said jacket to said housing,
means for suspension of pieces of laundry and clothing operatively connected with said jacket and said electrically auxiliary means comprises means for feeding warm air in upward direction.

17. The blower, as set forth in claim 16, wherein
said jacket is reinforced at the bottom to be self-carrying, and serves for anchoring on said carrier ring.

18. The blower, as set forth in claim 16, wherein
said branch includes a stream guiding cone and carries said suspension means for the pieces of laundry and clothing.

19. The blower, as set forth in claim 16, wherein
said suspension means comprises at least one suspension eye secured to said air blow-out branch.

20. The blower, as set forth in claim 16, wherein
said suspension means comprises selectively one of a snap-holder, clip-holder, hook-holder and magnet-holder, and
a carrier for a plurality of hangers connectable with one of said holders.

References Cited

UNITED STATES PATENTS

| | | | |
|---|---|---|---|
| 1,726,338 | 8/1929 | Brown | 219—368 X |
| 1,754,232 | 4/1930 | Fisher | 219—370 |
| 2,597,215 | 5/1952 | Wright et al. | 34—99 XR |

JOHN J. CAMBY, Primary Examiner

U.S. Cl. X.R.

34—99, 202; 219—368